United States Patent [19]

Kölzer et al.

[11] Patent Number: 4,540,926
[45] Date of Patent: Sep. 10, 1985

[54] CIRCUIT ARRANGEMENT FOR AN ALTERNATING CONTROL

[75] Inventors: Walter Kölzer; Wilhelm Reischer, both of Vienna, Austria

[73] Assignee: Siemens Aktiengesellschaft, Munich, Fed. Rep. of Germany

[21] Appl. No.: 449,834

[22] Filed: Dec. 14, 1982

[30] Foreign Application Priority Data

Dec. 23, 1981 [AT] Austria ................. 5529/81

[51] Int. Cl.³ ............................ G05B 11/36
[52] U.S. Cl. .................... 318/609; 318/610; 318/624
[58] Field of Search ............ 318/609, 610, 624, 803, 318/805

[56] References Cited

U.S. PATENT DOCUMENTS 4,338,559 7/1982 Blaschke et al. ............. 318/805

OTHER PUBLICATIONS

Howard V. Malmstadt et al., "Digital and Analog Data Conversions", W. A. Benjamin 1973, pp. 25, 26, 28, 29.
D. Ernst-D. Strole, "Industrieelektronik", 1973, pp. 62-96, Springer Verlag, New York.

Primary Examiner—William M. Shoop, Jr.
Assistant Examiner—Saul M. Bergmann
Attorney, Agent, or Firm—Kenyon & Kenyon

[57] ABSTRACT

In a circuit arrangement for an alternating control a PI controller comprises a first operational amplifier having an output connected via a resistor to the non-inverting input of a second operational amplifier wired as an impedance transformer. The output of the second operational amplifier is fed back via an RC stage to the inverting input of the first operational amplifier. The output of a second controller is connected via a decoupling diode to a junction between the decoupling resistor and the non-inverting input of the second operational amplifier. Positive as well as negative signals can occur at the output of the first operational amplifier, and discontinuities in control during a switch over between the two controllers are avoided.

4 Claims, 1 Drawing Figure

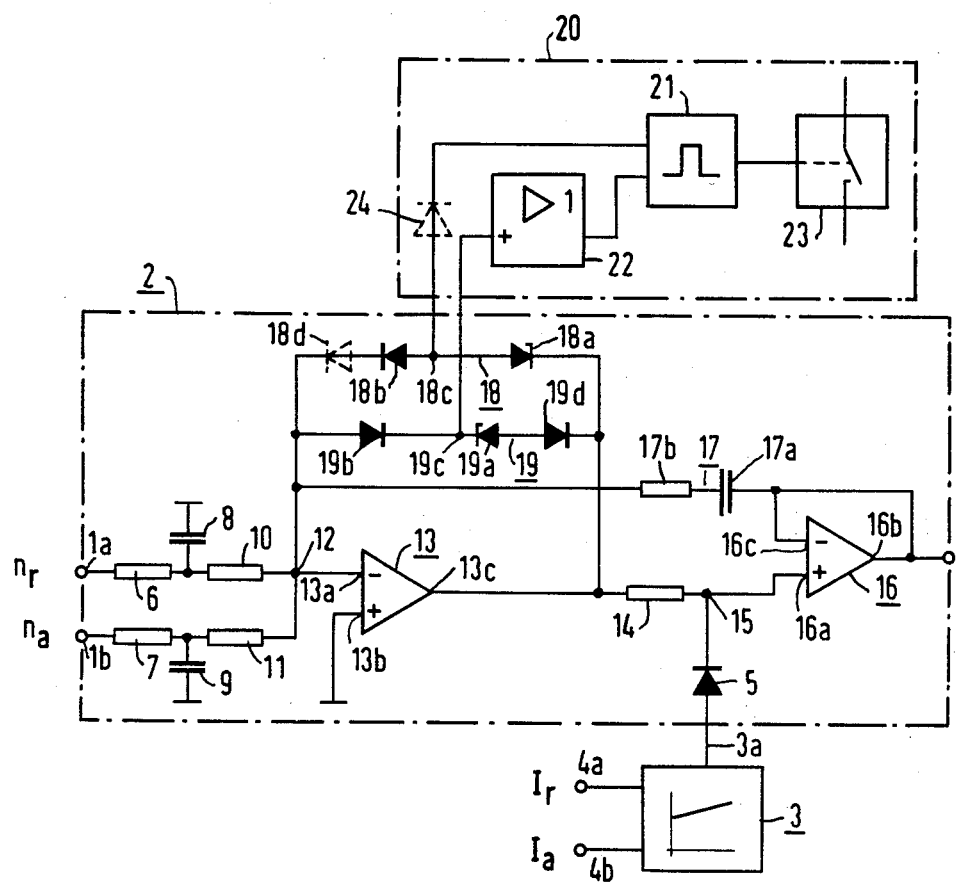

CIRCUIT ARRANGEMENT FOR AN ALTERNATING CONTROL

FIELD OF THE INVENTION

The present invention relates to a circuit for controlling the operation of an electromechanical device such as a d-c motor. More particularly, the present invention relates to such a circuit wherein a PI-type controller generally regulating the device is relieved under predetermined conditions by another controller.

BACKGROUND OF THE INVENTION

As described in the book "Industrieelectronik" ("Industrial Electronics"), Springer Verlag, 1973, at page 70, a PI controller in an alternating control circuit of the above-mentioned type comprises an operational amplifier having an output connected to an inverting input via a decoupling component and an RC stage, an output of the second controller being connected via a decoupling diode to the decoupling component at an end thereof opposite the output of the operational amplifier. The first or PI controller functions as a voltage control with alternating current limiting by the second controller. As described in the book, the decoupling component is realized in the form of a diode.

In this conventional alternating control circuit, the voltage control loop is normally closed. If (and only if) the current in the regulated device exceeds a predetermined limit or threshold, the current controller relieves the voltage controller and regulates the current to the permissible maximum. The voltage controller resumes control only upon the current's falling below the threshold valve. A seamless transition between the controllers is possible by means of the decoupling diodes.

A likely difficulty in the above described alternating control circuit involves charge reversal of feedback capacitors. Such capacitors are connected so that they are always charged up to the control voltage of the next-following converter, so that upon an alternation no control discontinuity occurs which is caused by a current surge of a capacitor in the feedback path. In such alternating control circuits, diodes are ineffective as decoupling elements if the signals at the outputs of the respective control amplifiers change polarities. If a faulty state of the regulated device or of the control element leads to an excessively large current value, then the voltage controller can be overdriven and fall out of engagement. While the output voltage of an operational amplifier can be kept within the nominal range in a controller, it would make sense for the protection of the controlled regulated device and, therefore, of the entire system, if an operator were alerted to the existence of an overdrive and if, in addition, the overdrive would lead to the shutting off or disabling of the regulated device.

SUMMARY OF THE INVENTION

The present invention has the object of providing an improved circuit arrangement of the above described type, wherein positive as well as negative signals can occur at the output of the operational amplifier in the voltage controller and wherein discontinuities are avoided upon alternation of control between the two controllers.

According to the present invention, the decoupling component is a resistor which is followed by an operational amplifier wired as an impedance transformer. The output of this amplifier is connected in the feedback path to the RC stage and carries the regulated quantity.

In a particularly advantageous embodiment of the present invention, the output of the first operational amplifier is connected, for limiting its output voltage in the positive and negative directions, to its inverting input via two separate limiting branches each having an ordinary diode and a Zener diode connected in opposition to each other, a junction point between the diodes in each branch being connected in the one limiting branch directly and in the other, via an inverting circuit, to an input of a delay stage which is in turn connected to a shut-off and alerting device. A decoupling diode may be connected in series with one of the Zener diodes. In this advantageous embodiment, the clamping diode circuit, which is commonly used for limiting, is extended by the diodes which are connected in series with the Zener diodes with reversed conduction direction. Tapping off the voltage drops at the diodes and generating a signal via an evaluation circuit indicates in a simple manner a disengagement of the first controller. A fault in the regulated device as well as in the alternating control circuit is thereby registered immediately and after a predetermined delay has passed, the controllers and the regulated device can be shut off.

BRIEF DESCRIPTION OF THE DRAWING

The sole FIGURE of the drawing is a circuit diagram, partially in block form, of an alternating control circuit according to the present invention.

SPECIFIC DESCRIPTION

An alternating control circuit according to the present invention is utilizable for regulating the speed of a d-c motor provided with a d-c control element. As shown in the drawing, a speed controller 2 of the PI type, has inputs 1a and 1b which receive signals $n_r$ ($n_{reference}$) and $n_a$ ($n_{actual}$) which represent the instantaneous desired and actual value of the d-c motor speed, respectively. To a second controller 3, which in the drawing is likewise a PI controller, a current limit value $I_r$ and an actual current value $I_a$ are fed via terminals 4a and 4b, signal $I_a$ corresponding to the actual load current value of the d-c motor as to magnitude and polarity. An output 3a of controller 3 is connected via a decoupling diode 5 to controller 2.

In controller 2 inputs 1a and 1b are connected to smoothing stages or low pass filters including resistors 6 and 7 and capacitors 8 and 9. The smoothing stages are connected via external resistors 10 and 11 to a summing point 12 which is tied to the inverting input 13a of an operational amplifier 13. The non-inverting input 13b of operational amplifier 13 is tied to a reference potential, e.g. ground. An output 13c of operational amplifier 13 is tied to a large decoupling resistor 14 having a resistance of several thousand ohms. Decoupling resistor 14 is connected to output 3a of controller 3 at a junction point 15. Resistor 14 is linked to the noninverting input 16a of a second operational amplifier 16 which is wired as an impedance transformer and which has an output 16b connected directly to an inverting input 16c. Output 16b is further connected via a capacitor 17a and a resistor 17b of an RC stage 17 to the inverting input 13a of amplifier 13, which is thus wired as a PI controller, a control signal for the following control set for the d-c control element being present at output 16b.

The operation of the alternating control circuit shown in the drawing corresponds to that described in the literature reference cited above. In normal operation, the speed control loop is closed and the regulated quantity is determined exclusively by controller unit 2. If the actual load current value increases beyond the limit value $I_r$, unit 3 replaces unit 2 and regulates the control set of the d-c control element. The decoupling is accomplished here via high-resistance resistor 14 and control discontinuities of unit 2 due to a current surge during the charge reversal of capacitor 17a in the feedback path are avoided particularly upon the switching back of control from unit 3 to unit 2.

If speed controller 2 is relieved by current-limiting controller 3 because of an excessive deviation of the actual speed value from the desired speed value, operational amplifier 13 can be overdriven and controller 2 can drop out of engagement. To avoid the disadvantages of overdriving, voltage monitoring branches 18 and 19 are provided for limiting the magnitude of positive polarity and negative polarity variations, respectively, in the output voltages of operational amplifier 13. Branch 18 includes a Zener diode 18a and a regular diode 18b connected in opposition to each other, while in branch 19 another Zener diode 19a and an another ordinary diode 19b are connected in oppositon to each other, a decoupling diode 19d being connected in series with Zener diode 19a. In the event of voltage limiting, the threshold value voltages which drop across diodes 18b and 19b, respectively, are present at junction points 18c and 19c. These threshold value voltages are fed to a schematically shown tripping circuit 20. In this circuit junction point 18c is connected directly to an input of a delay stage 21, junction point 19c being tied indirectly via an inverting circuit 22 likewise to an input of delay stage 21. Inverting circuit 22 is shown in the drawing as an inverter with a unitary gain. The output of delay stage 21 is followed by a make contact or switch 23 for actuating an operator alerting device and for shutting off controllers 2 and 3 and the d-c control element. If the tripping device is not designed without reaction, it may be necessary to provide decoupling diodes. Such a decoupling diode 24 is shown dashed. For compensating its threshold value voltage, an additional diode must be provided in the respective limiting branch 18 or 19, as is indicated by a dashed diode 18d.

If one of the limiting branches 18 or 19 responds, a signal is transmitted to tripping circuit 20 by means of the threshold value voltage at the diodes 18b or 19b, a signal of the same polarity being applied to the input of delay stage 21 because of the inversion in inverter 22. The make contact 23 is actuated upon a delay in stage 21. A few hundred milliseconds has been found to be an advantageous delay time. With this tripping device 20, a malfunction, for instance, of the d-c control element or of the driven d-c motor is ascertained immediately, an alert and a shut-off being effectuated if the malfunction still persists after the delay.

What is claimed is:

1. In an alternating control circuit having a first controller of the PI type for regulating the operation of an electromechanical device and a second controller for relieving said first controller under predetermined conditions, said first controller comprising a first operational amplifier with an output connected to an inverting input via a feedback loop including a decoupling component and an RC stage, said second controller having an output connected via a decoupling diode to said decoupling component on a side thereof opposite the output of said first operational amplifier, the improvement where said decoupling component is a resistor and said feedback loop includes a second operational amplifier wired as an impedance transformer with a non-inverting input connected to the output of said first operational amplifier via said resistor and to said second controller via said diode, said second operational amplifier having an output connected to said RC stage and connectable to said device for delivering a control signal thereto.

2. The improvement defined in claim 1 wherein the output of said first operational amplifier is connected to said inverting input via voltage monitoring means including a pair of branches for limiting the magnitude of negatively polarized variations and positively polarized variations, respectively, in the output voltage of said first operational amplifier, each of said branches including an ordinary diode and a Zener diode connected in opposition to each other.

3. The improvement defined in claim 2 wherein said voltage monitoring means includes disabling means for shutting off said device and for alerting an operator, one of said branches being connected to said disabling means via a delay stage and the other of said branches being connected to said disabling means via said delay stage and an inverting circuit, said disabling means being operatively linked to a junction in each of said branches located between the respective ordinary diode and Zener diode thereof.

4. The improvement defined in claim 2 or 3 wherein a branch of said pair includes a decoupling diode connected in series with the Zener diode of such branch.

* * * * *